United States Patent
Hsu et al.

(10) Patent No.: US 9,864,228 B2
(45) Date of Patent: Jan. 9, 2018

(54) PIXEL UNIT STRUCTURE AND DISPLAY DEVICE

(71) Applicant: Shenzhen China Star Optoelectronics Technology Co., Ltd., Shenzhen, Guangdong (CN)

(72) Inventors: Je Hao Hsu, Guangdong (CN); Chih Tsung Kang, Guangdong (CN); Xiaohui Yao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/418,609

(22) PCT Filed: Jan. 20, 2015

(86) PCT No.: PCT/CN2015/071076
§ 371 (c)(1),
(2) Date: May 10, 2016

(87) PCT Pub. No.: WO2016/106884
PCT Pub. Date: Jul. 7, 2016

(65) Prior Publication Data
US 2016/0246108 A1    Aug. 25, 2016

(30) Foreign Application Priority Data

Dec. 31, 2014 (CN) .......................... 2014 1 0856594

(51) Int. Cl.
*G02F 1/1335* (2006.01)
*G02F 1/1343* (2006.01)

(52) U.S. Cl.
CPC .. *G02F 1/133514* (2013.01); *G02F 1/134309* (2013.01); *G02F 2001/134345* (2013.01); *G02F 2201/52* (2013.01)

(58) Field of Classification Search
CPC ............. G02F 1/1343; G02F 1/134309; G02F 1/1368; G02F 1/1335; G02F 1/133514;
(Continued)

(56) References Cited

U.S. PATENT DOCUMENTS

| 6,449,025 B2 * | 9/2002 | Lee .................. G02F 1/133707 349/117 |
| 2012/0147065 A1 * | 6/2012 | Byun .................. G09G 3/3208 345/690 |

(Continued)

FOREIGN PATENT DOCUMENTS

| CN | 101162320 A | 4/2008 |
| CN | 102122460 A | 7/2011 |

(Continued)

OTHER PUBLICATIONS

International Search Report and Written Opinion, Jan. 20, 2015, China.

*Primary Examiner* — Thoi Duong
(74) *Attorney, Agent, or Firm* — Kim Winston LLP

(57) ABSTRACT

Disclosed is a pixel unit structure and display device, which belongs to the technical field of displays, and alleviates the problem that in the prior arts, a LCS design will reduce the transparency of the liquid crystal display device. The pixel unit structure comprises three different colored sub-pixels, namely a red sub-pixel, a green sub-pixel, and a blue sub-pixel, wherein at least one of the three sub-pixels is divided into a primary pixel region and a secondary pixel region, and the green sub-pixel has a one-piece structure.

13 Claims, 2 Drawing Sheets

(58) Field of Classification Search
CPC ............. G02F 1/1337; G02F 1/133707; G02F 1/134336; G02F 1/134363; G02F 1/1362; G02F 1/133753; G02F 2001/134345; G02F 2001/134354; G02F 2201/123; G02F 2201/52; G09G 2300/0452; G09G 2300/0426; G09G 2300/0447; G09G 2300/0439; G09G 3/3607; G09G 3/2003; G09G 2320/028; G09G 2320/0626; G06F 3/0412; H01L 27/14621; H01L 27/14645; H01L 27/3211; H01L 27/3213; H01L 27/3216; H01L 27/326
USPC ............... 349/129, 139, 144, 106, 141, 130; 345/88
See application file for complete search history.

(56) References Cited

U.S. PATENT DOCUMENTS

| | | | |
|---|---|---|---|
| 2012/0268357 A1* | 10/2012 | Shih | ............... G09G 3/3607 345/88 |
| 2014/0247418 A1 | 9/2014 | Chen et al. | |
| 2014/0300653 A1 | 10/2014 | Hsieh | |

FOREIGN PATENT DOCUMENTS

| | | |
|---|---|---|
| CN | 102749751 A | 10/2012 |
| CN | 103529611 A | 1/2014 |

* cited by examiner

PIXEL UNIT STRUCTURE AND DISPLAY DEVICE

The present application claims benefit of Chinese patent application CN201410856594.6, entitled "Pixel unit structure and display device" and filed on Dec. 31, 2014, the entirety of which is incorporated herein by reference.

TECHNICAL FIELD

The present disclosure relates to the technical field of displays, and in particular, to a pixel unit structure and a display device.

TECHNICAL BACKGROUND

With the development of display technology, liquid crystal display devices have become the most commonly used display devices.

Vertical alignment (VA) liquid crystal display device is a common liquid crystal display device. Currently, in order to alleviate the problem of large viewing angle color shift of VA liquid crystal display devices, a low color shift (LCS) design is introduced into the pixel unit, i.e. to divide each pixel unit into a primary pixel region and a secondary pixel region.

In the procedure of display, a same electric potential is charged into the primary pixel electrode in the primary pixel region and the secondary pixel electrode in the secondary pixel region, and then the voltage on the secondary pixel electrode is decreased, rendering the electric potential of the secondary pixel electrode lower than that of the primary pixel electrode. As such, the brightness of the secondary pixel region will be lower than that of the primary pixel region, and the deflection angle of liquid crystal molecules in the primary pixel region will be different from that of the liquid crystal molecules in the secondary pixel region. In this manner, the problem of large viewing angle color shift of VA liquid crystal display devices can be alleviated.

However, after a LCS design is introduced into the pixel unit, the area between the primary pixel region and the secondary pixel region becomes opaque, which reduces the aperture ratio of the liquid crystal display device, and further reduces the transparency of the liquid crystal display device. Therefore, under the current circumstance that the resolution of liquid crystal display devices is higher and higher, which renders the aperture ratio and transparency low, it is crucial to improve the transparency of liquid crystal display devices.

SUMMARY OF THE INVENTION

The objective of the present disclosure is to provide a pixel unit structure and a display device to alleviate the problem that in the prior arts, a low color shift (LCS) design will reduce the transparency of the liquid crystal display device.

The present disclosure provides a pixel unit structure which comprises three different colored sub-pixels, namely a red sub-pixel, a green sub-pixel, and a blue sub-pixel, wherein at least one of the three sub-pixels is divided into a primary pixel region and a secondary pixel region, and the green sub-pixel has a one-piece structure.

Preferably, the brightness of the primary pixel region is higher than that of the secondary pixel region.

Further preferably, the area of the primary pixel region is larger than that of the secondary pixel region.

Further preferably, the primary pixel region and the secondary pixel region each comprise four pixel domains.

In embodiment 1 of the present disclosure, the blue sub-pixel is divided into a primary pixel region and a secondary pixel region, and the red sub-pixel has a one-piece structure.

In embodiment 2 of the present disclosure, the red sub-pixel is divided into a primary pixel region and a secondary pixel region, and the blue sub-pixel has a one-piece structure.

In embodiment 3 of the present disclosure, the blue sub-pixel and the red sub-pixel are each divided into a primary pixel region and a secondary pixel region.

The present disclosure further provides a display device comprising a plurality of pixel units, each of the pixel units including a said pixel unit structure.

Preferably, the display device is a vertical alignment display device.

The present disclosure achieves the following beneficial effects. The pixel unit structure according to the present disclosure comprises a red sub-pixel, a green sub-pixel, and a blue sub-pixel, at least one of which adopts the LCS design and thus is divided into a primary pixel region and a secondary pixel region, so as to alleviate the problem of large viewing angle color shift of the VA liquid crystal display device. In the meanwhile, since the green sub-pixel has the highest transparency among the three sub-pixels, it hence does not adopt the LCS design, but configured as a one-piece structure in a traditional manner. Therefore, through configuring the green sub-pixel as a one-piece structure, the transparency of the liquid crystal display device can be greatly improved, thereby alleviating the problem that in the prior arts, a LCS design will reduce the transparency of the liquid crystal display device.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

The present disclosure provides a pixel unit structure which can be used in a vertical alignment (VA) liquid crystal display device. The pixel unit structure comprises three different colored sub-pixels, namely a red sub-pixel, a green sub-pixel, and a blue sub-pixel. At least one of the three sub-pixels is divided into a primary pixel region and a secondary pixel region, and the green sub-pixel has a one-piece structure.

The pixel unit structure according to the present embodiment comprises a red sub-pixel, a green sub-pixel, and a blue sub-pixel, at least one of which adopts a LCS (low color shift) design and thus is divided into a primary pixel region and a secondary pixel region, so as to alleviate the problem of large viewing angle color shift of the VA liquid crystal display device. In the meanwhile, since the green sub-pixel has the highest transparency among the three sub-pixels, it hence does not adopt the LCS design, but configured as a one-piece structure in a traditional manner.

Therefore, through configuring the green sub-pixel as a one-piece structure, the transparency of the liquid crystal display device will be greatly improved, thereby alleviating the problem that in the prior arts, a LCS design will reduce the transparency of the liquid crystal display device.

Embodiment 1

Figure 1:
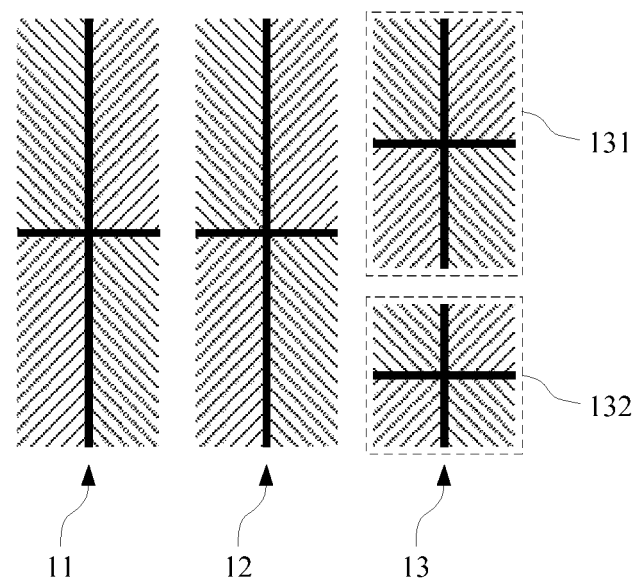
FIG. 1 schematically shows a pixel unit structure according to embodiment 1 of the present disclosure.

As shown in FIG. 1, the pixel unit structure provided in the present embodiment comprises three different colored sub-pixels, namely a red sub-pixel 11, a green sub-pixel 12, and a blue sub-pixel 13, among which the blue sub-pixel 13 adopts a LCS design and thus is divided into a primary pixel region 131 and a secondary pixel region 132, and the red sub-pixel 11 and the green sub-pixel 12 do not adopt the LCS design, but each configured as a one-piece structure in a traditional manner.

Preferably, the red sub-pixel 11 and the green sub-pixel 12 each comprise four pixel domains, and the primary pixel region 131 and the secondary pixel region 132 of the blue sub-pixel 13 each also comprise four pixel domains. As shown in FIG. 1, the red sub-pixel 11 and the green sub-pixel 12 each are provided therein with a pixel electrode, and the primary pixel region 131 and the secondary pixel region 132 of the blue sub-pixel 13 each are provided therein with a primary pixel electrode and a secondary pixel electrode, each of the pixel electrodes having a structure similar to fishbone. A cross-like main electrode serves as a dividing line among the pixel domains, and in each of the pixel domains is formed a comb electrode extending in all directions from the main electrode which, together with the comb electrode, forms the fishbone pixel electrode. In the procedure of display, the comb electrodes in the four pixel domains extend in different directions respectively, and therefore, under the drive of the comb electrodes, the deflection directions of the liquid crystal molecules in the four pixel domains are different from one another, thereby causing the liquid crystal display device to have a larger viewing angle.

In addition, the blue sub-pixel 13 according to the present embodiment adopts the LCS design, which can further alleviate the problem of large viewing angle color shift of VA liquid crystal display devices. In the procedure of display, a same electric potential is charged into the primary pixel electrode and the secondary pixel electrode of the blue sub-pixel 13, and meanwhile an appropriate electric potential is also charged into the pixel electrodes of the red sub-pixel 11 and of the green sub-pixel 12. Then the voltage on the secondary pixel electrode of the blue sub-pixel 13 is decreased, rendering the electric potential of the secondary pixel electrode lower than that of the primary pixel electrode. As such, the brightness of the secondary pixel region 132 will be lower than that of the primary pixel region 131, and the deflection angle of liquid crystal molecules in the primary pixel region 131 will be different from that of the liquid crystal molecules in the secondary pixel region 132, which will alleviate the problem of large viewing angle color shift of VA liquid crystal display devices.

According to the pixel unit structure provided in the present embodiment, the blue sub-pixel 13 adopts the LCS design and thus is divided into a primary pixel region 131 and a secondary pixel region 132, so as to alleviate the problem of large viewing angle color shift of VA liquid crystal display devices. In the meantime, since the red sub-pixel 11 and the green sub-pixel 12 have a higher transparency than the blue sub-pixel 13, they do not adopt the LCS design, but each configured as a one-piece structure in a traditional manner. Therefore, through configuring the red sub-pixel 11 and the green sub-pixel 12 each as a one-piece structure, the transparency of the liquid crystal display device will be greatly improved, thereby alleviating the problem that in the prior arts, a LCS design will reduce the transparency of the liquid crystal display device.

Preferably, in the present embodiment, the area of the primary pixel region 131 in the blue sub-pixel 13 is larger than that of the secondary pixel region 132. Since the brightness of the secondary pixel region is lower than that of the primary pixel region, the transparency of the liquid crystal display device is reduced. Besides, in the prior arts, the area of the secondary pixel region is larger than that of the primary pixel region. In the present embodiment, however, the area of the primary pixel region 131 is increased, and the area of the secondary pixel region 132 is decreased, which reduces the effect of the secondary pixel region 132 on transparency, and further increases the transparency of the liquid crystal display device, thereby alleviating the problem that in the prior arts, the LCS design reduces the transparency of the liquid crystal display device.

Moreover, liquid crystal display devices often display skin color images, and blue has a great influence on the display effect of skin color. By adopting the existing LCS design, each of the sub-pixels, including the blue sub-pixel, will have a secondary pixel region with an area larger than the primary pixel region. Since the blue light has a great brightness loss, when viewing from a large viewing angle, a user will see a yellowish skin color, thus influencing the display effect of the liquid crystal display device. In the present embodiment, the area of the primary pixel region 131 in the blue sub-pixel 13 is larger than that of the secondary pixel region 132, which will reduce the brightness loss of the blue light. Therefore, when viewing from a large viewing angle, a user will see a skin with the original color rather than a yellowish one, and thus the display effect of the liquid crystal display device is optimized.

Embodiment 2

Figure 2:
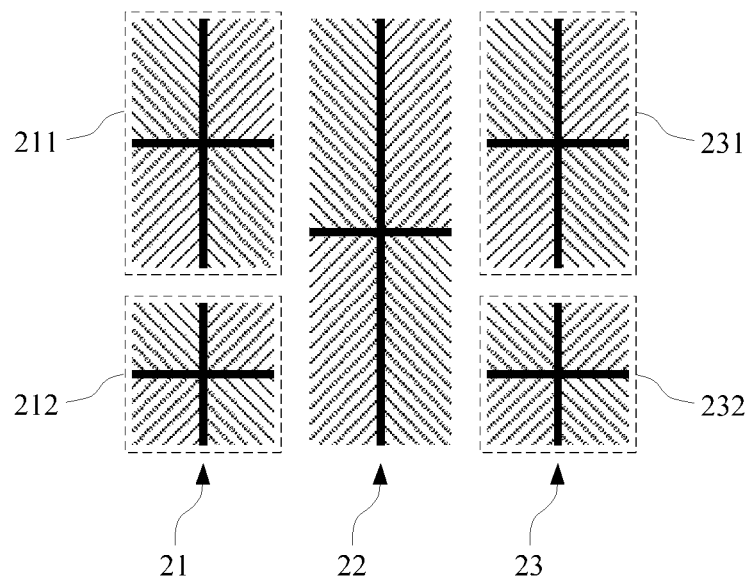
FIG. 2 schematically shows a pixel unit structure according to embodiment 2 of the present disclosure.

As shown in FIG. 2, the pixel unit structure provided in the present embodiment comprises three different colored sub-pixels, namely a red sub-pixel 21, a green sub-pixel 22, and a blue sub-pixel 23, among which the red sub-pixel 21 and the blue sub-pixel 23 each adopt the LCS design, with the red sub-pixel 21 being divided into a primary pixel region 211 and a secondary pixel region 212, and the blue sub-pixel 23 being divided into a primary pixel region 231 and a secondary pixel region 232, and the green sub-pixel does not adopt the LCS design, but configured as a one-piece structure in a traditional manner.

Preferably, the green sub-pixel 22 comprises four pixel domains, and a primary pixel region 211 and a secondary pixel region 212 in the red sub-pixel 21, as well as a primary pixel region 231 and a secondary pixel region 232 in the blue sub-pixel 23, each comprise four pixel domains. As shown in FIG. 2, the green sub-pixel 22 is provided therein with a pixel electrode; the primary pixel region 211 and the secondary pixel region 212 in the red sub-pixel 21 each are provided therein with a primary pixel electrode and a secondary pixel electrode; and the primary pixel region 231 and the secondary pixel region 232 of the blue sub-pixel 23 each are also provided therein with a primary pixel electrode and a secondary pixel electrode, each of the pixel electrodes having a structure similar to fishbone. A cross-like main electrode serves as a dividing line among the pixel domains, and in each of the pixel domains is formed a comb electrode extending in all directions from the main electrode which, together with the comb electrode, forms the fishbone pixel electrode. In the procedure of display, the comb electrodes in the four pixel domains extend in different directions respectively, and therefore, under the drive of the comb electrodes, the deflection directions of the liquid crystal molecules in the four pixel domains are different from one another, thereby causing the liquid crystal display device to have a larger viewing angle.

In addition, in the present embodiment, the red sub-pixel 21 and blue sub-pixel 23 each adopt the LCS design, which can further alleviate the problem of large viewing angle color shift of VA liquid crystal display devices. In the procedure of display, a same electric potential is charged into the primary pixel electrode and the secondary pixel electrode of the red sub-pixel 21, then the same is done to the primary pixel electrode and the secondary pixel electrode of the blue sub-pixel 23, and meanwhile an appropriate electric potential is also charged into the pixel electrode of the green sub-pixel 22. After that, the voltage on the secondary pixel electrode of the red sub-pixel 21 and of the green sub-pixel 23 is decreased, rendering the electric potential of the secondary pixel electrode lower than that of the primary pixel electrode. As such, the brightness of the secondary pixel region 212 in the red sub-pixel 21 will be lower than that of the primary pixel region 211, and the deflection angle of liquid crystal molecules in the primary pixel region 211 will be different from that of the liquid crystal molecules in the secondary pixel region 212; and the brightness of the secondary pixel region 232 in the blue sub-pixel 23 will be lower than that of the primary pixel region 231, and the deflection angle of liquid crystal molecules in the primary pixel region 231 will be different from that of the liquid crystal molecules in the secondary pixel region 232, which will alleviate the problem of large viewing angle color shift of VA liquid crystal display devices.

According to the pixel unit structure provided in the present embodiment, the red sub-pixel 21 and blue sub-pixel 23 each adopt the LCS design and are divided into a primary pixel region and a secondary pixel region, so as to alleviate the problem of large viewing angle color shift of VA liquid crystal display devices. In the meantime, since the green sub-pixel 22 has the highest transparency among the three sub-pixels, it does not adopt the LCS design, but configured as a one-piece structure in a traditional manner. Therefore, through configuring the green sub-pixel 22 as a one-piece structure, the transparency of the liquid crystal display device can be greatly improved, thereby alleviating the problem that in the prior arts, a LCS design will reduce the transparency of the liquid crystal display device.

Preferably, in the present embodiment, the area of the primary pixel region 231 in the blue sub-pixel 23 is larger than that of the secondary pixel region 232. Since the brightness of the secondary pixel region is lower than that of the primary pixel region, the transparency of the liquid crystal display device is reduced. Besides, in the prior arts, the area of the secondary pixel region is larger than that of the primary pixel region. In the present embodiment, however, the area of the primary pixel region 231 is increased, and the area of the secondary pixel region 232 is decreased, which reduces the effect of the secondary pixel region 232 on transparency, and increases the transparency of the liquid crystal display device, thereby alleviating the problem that in the prior arts, a LCS design reduces the transparency of the liquid crystal display device. Likewise, the area of the primary pixel region 211 in the red sub-pixel 21 is larger than that of the secondary pixel region 212, which reduces the effect of the secondary pixel region 212 on transparency, and increases the transparency of the liquid crystal display device.

Moreover, liquid crystal display devices often display skin color images, and blue has a great influence on the display effect of skin color. By adopting the existing LCS design, each of the sub-pixels including the blue sub-pixel, will have a secondary pixel region with an area larger than the primary pixel region. Since the blue light has a great brightness loss, when viewing from a large viewing angle, a user will see a yellowish skin color, thus influencing the display effect of the liquid crystal display device. In the present embodiment, the area of the primary pixel region 231 in the blue sub-pixel 23 is larger than that of the secondary pixel region 232, which will reduce the brightness loss of the blue light. Therefore, when viewing from a large viewing angle, a user will see a skin with the original color rather than a yellowish one, and thus the display effect of the liquid crystal display device is optimized.

Embodiment 3

Figure 3:
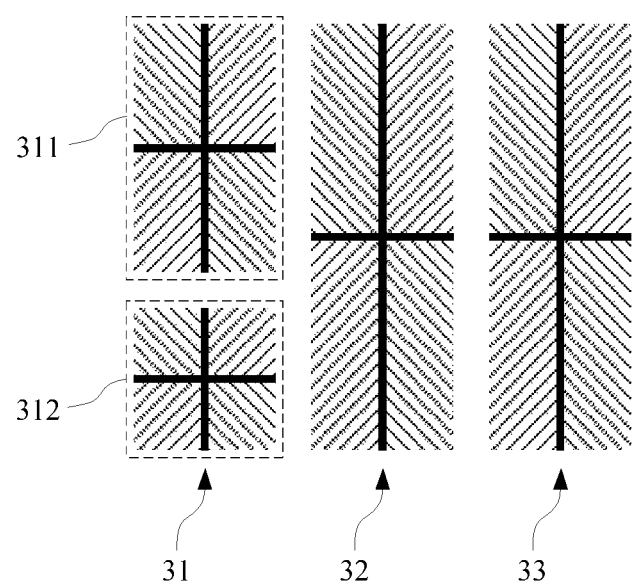
FIG. 3 schematically shows a pixel unit structure according to embodiment 3 of the present disclosure.

As shown in FIG. 3, the pixel unit structure provided in the present embodiment comprises three different colored sub-pixels, namely a red sub-pixel 31, a green sub-pixel 32, and a blue sub-pixel 33, among which the red sub-pixel 31 adopts the LCS design and is divided into a primary pixel region 311 and a secondary pixel region 312, and the green sub-pixel 32 and the blue sub-pixel 33 do not adopt a LCS design, but each configured as a one-piece structure in a traditional manner.

Preferably, the green sub-pixel 32 and the blue sub-pixel 33 each comprise four pixel domains, and the primary pixel region 311 and the secondary pixel region 312 of the red sub-pixel 31 each also comprise four pixel domains. As shown in FIG. 3, the green sub-pixel 32 and the blue sub-pixel 33 each are provided therein with a pixel electrode, and the primary pixel region 311 and the secondary pixel region 312 of the red sub-pixel 31 each are provided therein with a primary pixel electrode and a secondary pixel electrode, each of the pixel electrodes having a structure similar to fishbone. A cross-like main electrode serves as a dividing line among the pixel domains, and in each of the pixel domains is formed a comb electrode extending in all directions from the main electrode which, together with the comb electrode, forms the fishbone pixel electrode. In the procedure of display, the comb electrodes in the four pixel domains extend in different directions respectively, and therefore, under the drive of the comb electrodes, the deflection directions of the liquid crystal molecules in the four pixel domains are different from one another, thereby causing the liquid crystal display device to have a larger viewing angle.

In addition, the red sub-pixel 31 according to the present embodiment adopts the LCS design, which can further alleviate the problem of large viewing angle color shift of VA liquid crystal display devices. In the procedure of display, a same electric potential is charged into the primary pixel electrode and the secondary pixel electrode of the red sub-pixel 31, and meanwhile an appropriate electric potential is also charged into the pixel electrodes of the green sub-pixel 32 and of the blue sub-pixel 33. Then the voltage on the secondary pixel electrode of the red sub-pixel 31 is decreased, rendering the electric potential of the secondary pixel electrode lower than that of the primary pixel electrode. As such, the brightness of the secondary pixel region 312 will be lower than that of the primary pixel region 311, and the deflection angle of liquid crystal molecules in the primary pixel region 311 will be different from that of the liquid crystal molecules in the secondary pixel region 312, which will alleviate the problem of large viewing angle color shift of VA liquid crystal display devices.

According to the pixel unit structure provided in the present embodiment, the red sub-pixel 31 adopts the LCS design and is divided into a primary pixel region 311 and a secondary pixel region 312, so as to alleviate the problem of large viewing angle color shift of VA liquid crystal display devices. In the meantime, since the green sub-pixel 32 has the highest transparency among the three sub-pixels, it does not adopt the LCS design, but configured as a one-piece structure in a traditional manner. Therefore, by configuring the green sub-pixel 32 as a one-piece structure, the transparency of the liquid crystal display device can be greatly improved, thereby alleviating the problem that in the prior arts, a LCS design will reduce the transparency of the liquid crystal display device. Besides, the blue sub-pixel 33 does not adopt the LCS design, but configured as a one-piece structure in a traditional manner, which, to some degree, can also improve the transparency of the liquid crystal display device.

Preferably, in the present embodiment, the area of the primary pixel region 311 in the red sub-pixel 31 is larger than that of the secondary pixel region 312. Since the brightness of the secondary pixel region is lower than that of the primary pixel region, the transparency of the liquid crystal display device is reduced. Besides, in the prior arts, the area of the secondary pixel region is larger than that of the primary pixel region. In the present embodiment, however, the area of the primary pixel region 311 is increased, and the area of the secondary pixel region 312 is decreased, which reduces the effect of the secondary pixel region 312 on transparency, and increases the transparency of the liquid crystal display device, thereby alleviating the problem that in the prior arts, a LCS design reduces the transparency of the liquid crystal display device.

Embodiment 4

The present embodiment provides a display device, which is, preferably, a VA display device, and specifically, can be a liquid crystal display television, a liquid crystal display device, a cell phone, a table PC, etc. The display device comprises a plurality of pixel units, and each of the pixel units has the pixel unit structure provided in the above embodiments of the present disclosure.

The display device provided in the present embodiment has the same technical features as the pixel unit structure provided in embodiments 1, 2, and 3 of the present disclosure, and therefore is able to solve the same technical problem and achieve a same technical effect as embodiments 1, 2, and 3.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. A pixel unit structure, comprising three different colored sub-pixels, namely a red sub-pixel, a green sub-pixel, and a blue sub-pixel,
   wherein at least one of the three sub-pixels is divided into a primary pixel region and a secondary pixel region, and the green sub-pixel has a one-piece structure, and
   wherein the red sub-pixel is divided into a primary pixel region and a secondary pixel region.

2. The pixel unit structure according to claim 1, wherein the brightness of the primary pixel region is higher than that of the secondary pixel region.

3. The pixel unit structure according to claim 1, wherein the area of the primary pixel region is larger than that of the secondary pixel region.

4. The pixel unit structure according to claim 1, wherein the primary pixel region and the secondary pixel region each comprise four pixel domains.

5. The pixel unit structure according to claim 1, wherein the blue sub-pixel has a one-piece structure.

6. The pixel unit structure according to claim 1, wherein the blue sub-pixel is divided into a primary pixel region and a secondary pixel region.

7. A display device, comprising a plurality of pixel units, each of the pixel units including a pixel unit structure comprising three different colored sub-pixels, namely a red sub-pixel, a green sub-pixel, and a blue sub-pixel,
   wherein at least one of the three sub-pixels is divided into a primary pixel region and a secondary pixel region, and the green sub-pixel has a one-piece structure, and
   wherein the red sub-pixel is divided into a primary pixel region and a secondary pixel region.

8. The display device according to claim 7, wherein the brightness of the primary pixel region is higher than that of the secondary pixel region.

9. The display device according to claim 7, wherein the area of the primary pixel region is larger than that of the secondary pixel region.

10. The display device according to claim 7, wherein the primary pixel region and the secondary pixel region each comprise four pixel domains.

11. The display device according to claim 7, wherein the blue sub-pixel has a one-piece structure.

12. The display device according to claim 7, wherein the blue sub-pixel is divided into a primary pixel region and a secondary pixel region.

13. The display device according to claim 7, wherein the display device is a vertical alignment display device.

* * * * *